United States Patent

Rodhammer et al.

Patent Number: 5,122,422
Date of Patent: Jun. 16, 1992

[54] COMPOSITE BODY MADE OF GRAPHITE AND HIGH-MELTING METAL

[75] Inventors: Peter Rodhammer, Ruette; Karlheinz Kailer, Breitenwang, all of Austria

[73] Assignee: Schwarzkopf Technologies Corporation, New York, N.Y.

[21] Appl. No.: 529,113

[22] Filed: May 25, 1990

[30] Foreign Application Priority Data

May 26, 1989 [AT] Austria .................. 1271/89

[51] Int. Cl.⁵ .......................................... H01J 35/10
[52] U.S. Cl. ................................. 428/634; 428/635; 428/670; 313/355; 378/144
[58] Field of Search ............... 428/634, 665, 670, 408; 313/311, 355; 378/144

[56] References Cited

U.S. PATENT DOCUMENTS

| | | | |
|---|---|---|---|
| 4,131,708 | 12/1978 | Moores et al. | 428/408 |
| 4,362,821 | 12/1982 | Lin | 502/164 |
| 4,482,837 | 11/1984 | Koizumi et al. | 378/144 |
| 4,641,334 | 2/1987 | Devine, Jr. | 378/144 |
| 4,689,810 | 8/1987 | Devine, Jr. | 378/144 |
| 4,777,643 | 10/1988 | Devine | 378/144 |
| 4,851,206 | 7/1989 | Boudart et al. | 423/440 |
| 4,912,305 | 3/1990 | Tatemasu et al. | 219/544 |
| 4,920,012 | 4/1990 | Woodruff et al. | 428/634 |

FOREIGN PATENT DOCUMENTS

| | | |
|---|---|---|
| 278184 | 1/1970 | Austria . |
| 0023065 | 1/1981 | European Pat. Off. . |
| 0273161 | 6/1988 | European Pat. Off. . |
| 0305547 | 8/1989 | European Pat. Off. . |
| 1106429 | 10/1961 | Fed. Rep. of Germany . |
| 1225023 | 9/1966 | Fed. Rep. of Germany . |
| 2263820 | 7/1973 | Fed. Rep. of Germany . |
| 2115896 | 3/1977 | Fed. Rep. of Germany . |
| 2748566 | 6/1980 | Fed. Rep. of Germany . |
| 59-114739 | 2/1984 | Japan . |

OTHER PUBLICATIONS

Gonser, B. W., *Rhenium*, Paper presented at the Symposium on Rhenium, May 3–4, 1960, Chicago, Ill.
CRC Handbook of Chemistry and Physics, 60th ed., 1980, pp. B 116–117.

*Primary Examiner*—R. Dean
*Assistant Examiner*—George Wyszomierski
*Attorney, Agent, or Firm*—Morgan & Finnegan

[57] ABSTRACT

A composite body for rotary anodes of X-ray tubes is made from graphite, a carbide-forming, high-melting metal component and a multi-layered intermediate layer. The first layer of the intermediate layer closest to the graphite is made up of a metal or an alloy thereof which does not form a carbide. Applied over the first layer are at least two double layers. Each double layer has one individual layer of at least one carbide-forming metal or at least one carbide thereof, and a second individual layer of a metal or an alloy thereof which does not form a carbide. Preferred carbide-forming metals are tungsten, tantalum, hafnium and niobium. Preferred metals which do not form carbides are rhenium and platinum. In a preferred embodiment, the composite body is a rotary anode for X-ray tubes, with a basic body made of graphite and a burning track made of tungsten or a tungsten-rhenium alloy applied directly to the intermediate layer.

12 Claims, 1 Drawing Sheet

COMPOSITE BODY MADE OF GRAPHITE AND HIGH-MELTING METAL

FIELD OF THE INVENTION

The invention relates to a composite body made of graphite, a carbide-forming, high-melting metal component, and a multi-layer intermediate layer applied to the graphite by means of a coating process. The first layer of the intermediate layer, which is arranged over the graphite, is made up of a metal or an alloy thereof which does not form a carbide.

BACKGROUND OF THE INVENTION

Material composites made of graphite and high- melting metals, instead of high-melting metals only, have found increasing utility in a number of high-temperature applications. When compared to one-component materials consisting only of high-melting metals, these composite structures permit expanded high-temperature applications as a result of their superior heat storage capacity and also due to the lower specific weight of the graphite. One important application of such material composites is in rotary anodes for X-ray tubes.

A good high temperature-proof bond between the graphite and the high-melting metal is an important factor relating to the usability of material composite structures. When heat has to be rapidly dissipated from the high-melting metal, as for example in rotary anodes, the bond between the high-melting metal and the graphite should have fairly good thermal conductivity in order to exploit the high heat storage capacity of the graphite. In addition, when using carbide-forming high-melting metals, as little carbon as possible should diffuse from the graphite into the high-melting metal at the high application temperatures in order to prevent the high-melting metal from forming carbide. Formation of carbide causes brittleness and thus deterioration of the resistance to thermal shock of the composite body, as well as deterioration of the good thermal conductivity of the carbide-forming high-melting metal itself.

Various designs of composite bodies made of graphite and carbide-forming, high-melting metals are known in the art. One embodiment is that of a solid basic body of graphite, which is joined with a thin coating of carbide-forming, high-melting metal, the thickness of the coating being in the order of magnitude of up to 1000 μm. If the coating of the carbide-forming, high-melting metal were applied to the graphite directly, then the high temperatures generally prevailing during operation of the composite body would cause the high-melting metal to convert into a carbide through diffusion of carbon from the graphite. This means that a single or multi-layer intermediate layer has to be arranged between the graphite and the carbide-forming, high-melting metal. The intermediate layer serves as a barrier for the diffusion of carbon. Such barriers are known. As a rule, the intermediate and the top or cover layers of the carbide-forming, high-melting metal are applied to the graphite by special coating processes, e.g. the CVD or the PVD-process.

For example, it has already been proposed to arrange a single-layer intermediate layer of tantalum between a basic body made of graphite and a tungsten layer. At the high operating temperatures of the composite body, the tantalum layer is transformed into tantalum carbide through carbon diffusion from the graphite. The tantalum carbide then forms a diffusion barrier preventing any further diffusion of carbon into the tungsten layer. The intermediate layer has to be of adequate thickness in order to safely avoid the carburization of the tungsten layer even under extreme operating conditions in terms of temperature and time. However, due to the brittleness of the tantalum carbide and the differing coefficients of thermal expansion of the individual materials, whose effect becomes stronger with increasing layer thicknesses, the layered composite often becomes detached from the basic graphite body when the composite body is stressed by thermal shock.

DE-OS 22 63 820 describes the arrangement of a two-layer intermediate layer in a rotary anode with a basic body of graphite and a burning track layer consisting of carbide-forming a high-melting metal, for example tungsten. The layer of the intermediate layer that is directly arranged on the graphite consists of a metal not forming carbide such as iridium, osmium, or ruthenium. The second layer of the intermediate layer consists of a carbide-forming, high-melting metal such as hafnium, niobium, tantalum or zirconium.

The second layer, which at the operating temperature of the rotary anode is transformed into a brittle carbide through diffusion of carbon from the graphite, is joined with the graphite body via the metallic and thus plastic layer. This plasticity of the metallic layer is expected to compensate for variations in the expansion of the individual materials under thermal stress, and therefore is expected to obtain good adhesion of the burning track layer to the graphite body. In practice, however, a gradual but constantly increasing carburization of the burning track occurs over time in spite of the presence of the intermediate layer. This in turn leads to early failure of the rotary anode due to detachment of large-size parts of the burning track from the graphite, or as the result of particles which chip off the burning track.

EP-PS 0 023 065 describes a rotary anode for X-ray tubes. The anode consists of a solid basic graphite body and a thin burning track made of a high-melting metal, the latter being applied to the basic graphite body via a three-layered intermediate layer. The individual layers of this intermediate layer abutting the basic body and the burning track consist of pure rhenium. An additional layer consisting of an alloy of rhenium with at least one carbide-forming metal such as tungsten, tantalum or hafnium is arranged between these layers. One drawback of this embodiment of a rotary anode is that at the temperatures used in the application of the coating, or prevailing when the anode is operating, a compound is formed in the layer consisting of the alloy of rhenium with the carbide-forming metal which is brittle. In the case of tungsten-rhenium, a so-called sigma-phase develops, which has a highly unfavorable thermal conductivity that is much lower when compared with pure tungsten. As the sigma-phase extends across the total thickness of the coating after a longer time of use, these rotary anodes also break down early due to the mechanical or thermal failure of the burning track.

Another rotary anode for X-ray tubes is also described in JP-A 59-114739, in which a three-layer intermediate layer consisting of a first layer of rhenium, a second layer of a carbide, e.g. molybdenum carbide, and a third layer of rhenium again, is arranged between the basic graphite body and the target consisting of high-melting metal. The rhenium of the first layer and the carbide of the second layer are deposited on the basic graphite body from the gas phase. The rhenium of the third layer is formed by a foil or sheet, which for the manufacture of the composite body, is inserted between the coated basic body and the target. This structural arrangement of the intermediate layer also cannot completely prevent the carburization of the burning track.

Another known embodiment of a composite body consists of a solid basic body made of graphite and a solid part consisting of a carbide-forming, high-melting metal, the latter being joined with the basic body by soldering or diffusion welding via one or several intermediate layers. In most cases, composite bodies consisting of a solid basic body of graphite and a solid part made of a carbide-forming, high-melting metal are manufactured by arranging the solder or connecting material between the two parts without any additional intermediate layer, and then by joining the parts by melting the solder or by combining the parts by hot pressing. Such embodiments are described, for example in DE-B-12 25 023, EP-B-0 037 956, DE-B-21 15 896, and DE-C-27 48 566. One drawback with these composite bodies is that the solder material may to some extent carburize, the result being the negative phenomena heretofore described. Additionally, with these embodiments relatively thick layers of the material which does not form a carbide such as rhenium often have to be used in order to safely exclude the formation of carbide in the high-melting metal part. However, this is not justifiable in terms of cost in many cases. Furthermore, during the soldering or hot pressing, degassing of the graphite may occur which will promote the adverse formation of blowholes in the intermediate layer.

U.S. Pat. No. 4,777,643 describes a rotary anode consisting of a basic graphite body and a part made of a high-melting metal which supports the burning track, the two parts being joined via a diffusion bond. In order to avoid the formation of carbide in the high-melting part to the greatest possible degree, the parts are joined through the use of an intermediate layer consisting of platinum or a platinum alloy and an intermediate layer consisting of tantalum or niobium, or alloys thereof. This design, however, also does not adequately meet all operating requirements for rotary anodes.

The deposition of pure rhenium or rhenium-containing layers from the gas phase has been known in connection with rotary anodes for a long period of time and has been described, for example in DE-B-11 06 429, or AT-B-278 184.

OBJECTS OF THE INVENTION

It is therefore an object of the present invention to provide a composite body made of graphite and a carbide-forming, high-melting metal component using a multi-layered intermediate layer between the graphite and metal component which is as thin as possible.

It is a further object of the invention to provide a composite body in which little or no interfering cracking in the intermediate layer and mainly no destruction of the composite due to delamination will occur even at high operating temperatures of up to 1350° C. for relatively long periods of time.

Another object of the invention is to provide a composite body in which any carburization of the carbide-forming, high-melting metal component adversely affecting the service life of the composite body is substantially excluded.

A further object is to provide a composite body which is manufactured from solid parts made up of graphite and carbide-forming, high-melting metals joined together by soldering such that degassing of the graphite within the soldering zone and thus adverse formation of blowholes in the solder is substantially excluded.

SUMMARY OF THE INVENTION

These and other objects of the invention are achieved by providing a composite body suitable for use as a rotary anode in X-ray tubes made of a graphite body and an intermediate layer arranged over the graphite body. A high-melting metal component is arranged over the intermediate layer. The intermediate layer has a first layer of a metal or an alloy thereof which does not form a carbide arranged over the graphite body. The intermediate layer also has at least two succeeding double layers. That is, each successive double layer is arranged farther from the graphite body than the double layer immediately preceding it.

Each double layer is made up of a first and a second individual layer. The second individual layer is disposed over the first individual layer. Each first individual layer is comprised of at least one carbide-forming metal or at least one carbide thereof. Each second individual layer is made up of a metal or an alloy thereof which does not form a carbide. Each first individual layer is disposed closest to the graphite body. If more than two double layers are utilized, then the second individual layer which would normally be closest to the high-melting metal component may be omitted.

In a preferred embodiment of the invention, the first layer of the intermediate layer is made up of rhenium. There are then six succeeding double layers such that each of the first individual layers are comprised of tungsten or tungsten carbide, and each of the second individual layers are made of rhenium. Preferably, the thickness of each of the rhenium individual layers is about the same as the thickness of each of the tungsten or tungsten carbide individual layers. The overall thickness of the intermediate layers about the same as the overall thickness of the intermediate layer in the embodiment heretofore described with only two double layers.

DETAILED DESCRIPTION OF THE PREFERRED EMBODIMENTS

Figure 1:
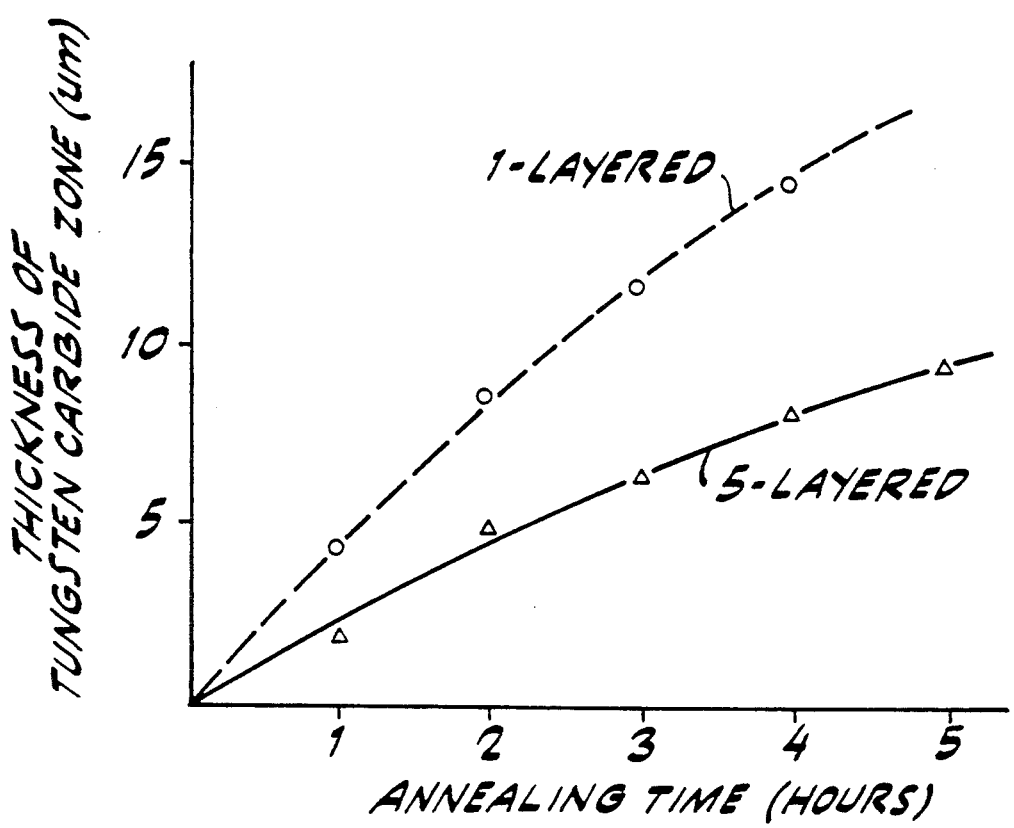
FIG. 1 is a graph comparing the thickness of the tungsten carbide zone over time at a temperature of 1300 degrees C. for a composite body according to one embodiment of the present invention as compared with the state of the art.

According to the invention, the problems of the prior art composite bodies are substantially avoided when at least two double layers are arranged adjoining the first layer of the intermediate layer, i.e. the first layer closest to the graphite. The first double layer comprises a first individual layer of one or several carbide-forming metals or their carbides or mixed carbides, and a second individual layer of a metal or an alloy thereof which does not form a carbide. The second or more double layers also have first and second individual layers with the same material components as the first and second individual layers, respectively, of the first double layer. The result is that these first and second individual layers alternate throughout the intermediate layer.

In order to prevent carbon from diffusing from the graphite into the high-melting metal component, it has been deemed adequate heretofore in the art to arrange, as a rule, only one layer of carbide or carbide-forming metal in multi-layered intermediate layer structures. If need be, this layer of carbide-forming metal is arranged next to one or several layers of a metal not forming carbide. In order to prevent the diffusion of carbon as completely as possible, it has also been necessary to vary the thickness of the intermediate layer, and in particular to provide as thick a layer of carbide or carbide-forming metal as possible. This, in turn, has hindered good thermal conductivity between the graphite and the high-melting metal component because of the relatively poor thermal conductivity of the carbide layer. Furthermore, due to the brittleness of the carbide layer of the intermediate layer structure, greater layer thicknesses often lead to poorer stressability of the composite body by thermal shock.

The entirely surprising realization on which the invention is based is the fact that with an approximately constant overall thickness of the intermediate layer, the prevention of carburization of the high-melting metal component is even more effective if, in the intermediate layer, the carbide layer or layer of carbide-forming metal is arranged not in the form of one single layer, but in the form of a plurality of layers, each of these layers being separated from one other by a layer comprising a metal which does not form a carbide. This in particular applies if the overall thickness of the carbide or carbide-forming individual layers is not greater than the thickness of the carbide or carbide-forming layer in a single-layer arrangement of the layer according to the state of the art.

By incorporating several layers of carbide-forming metals or their carbides without any share of a metal which does not form a carbide (as opposed to EP-PS 0 023 065), the coherent, that is, not skeleton-like carbide layer according to the invention safely prevents the diffusion of carbon from the basic body into the carbide-forming, high-melting metal component with significantly higher reliability as compared to the current state of the art. In addition, based on the layer structure according to the invention, the development of an intermetallic phase is limited to the very thin zones between the carbide-forming metal and the noncarbide-forming metal, i.e., the metal directly on the interface, which to a large extent excludes the drawbacks of such phases which, being solid bodies, are brittle (ductilization through sandwich structure). The layer thicknesses required for adequately blocking and preventing carbon diffusion are so relatively small that no significant increase in the thermal resistance occurs in the embodiments of a composite body according to the invention, as normally feasible for their manufacture.

This blocking function for preventing the diffusion of carbon is obtained through a combination of the layers of metal which does not form a carbide and the carburized layers of the carbide-forming metal in the intermediate layer. The carburized layers can be manufactured by depositing them in the form of carbides or by first applying only the carbide-forming metal, which subsequently is transformed into the corresponding carbide during the course of an effective annealing treatment.

The diffusion-blocking effect is greater the larger the number of individual layers or double layers of the intermediate layer, while still maintaining a constant overall thickness of the intermediate layer. This increase in the blocking effect, which is surprisingly high when compared to the state of the art, is presumably achieved when, starting from the graphite, the individual carbide-forming layers are successively converted into carbide through diffusion of carbon by way of the individual abutting layers made up of a metal which does not form a carbide. This means that any further diffusion of carbon through a layer of a metal which does not form carbide into a subsequent carbide-forming layer removed from the graphite will only commence with a correspondingly reduced growth rate, that is, after the carbide-forming layer disposed closer to the graphite has been basically transformed completely into stoichiometric carbide. If metal-carbon compounds with different atomic ratios appear (e.g. $Me_3C$, $Me_2C$, $MeC$, $MeC_2$), the individual carburization stages will again be passed successively as measured by time, starting from the graphite, with clear separation in terms of space by the intermediate layers of a material that does not form a carbide.

Rhenium and platinum are especially suitable as the metal which does not form carbide, whereas tungsten, tantalum, hafnium and niobium are well-suited for the carbide-forming metal.

A carbon diffusion blocking effect that is clearly acceptable for many applications can be obtained with a structure of the intermediate layer having two double layers, each double layer comprising an individual layer of carbide-forming metal or its corresponding carbide and an individual layer comprising a metal which does not form carbide. With such a layer structure, the double layers have to be applied completely, with the result being that the individual layers made of a carbide-forming metal or its carbide are, in each case, arranged between two individual layers made up of a metal which does not form a carbide. A preferred composite body which has been successfully tested has an intermediate layer with the layer sequence as follows (starting from the graphite): rhenium -- tungsten or tungsten carbide -- rhenium -- tungsten or tungsten carbide -- rhenium, respectively. Another preferred embodiment in which the intermediate layer has six double layers following the first layer nearest the graphite has also been successfully tested. Such a composite body had a diffusion blocking effect which was enhanced even further. This intermediate layer has the sequence as follows (starting from the graphite side): Re -- W or WC -- Re -- W or WC -- Re -- W or WC -- Re -- W or WC -- Re -- W or WC -- Re -- W or WC -- Re, respectively. Preferably, all the individual layers have about the same layer thickness.

In another preferred embodiment of the invention there is an intermediate layer in which more than two double layers are arranged, the layer comprising a metal which does not form a carbide can be omitted in the last double layer.

Also provided is a composite body in the form of a rotary anode for X-ray tubes, with a basic body made of graphite and a burning track made of tungsten or a tungsten-rhenium alloy, in which the track is directly applied to the intermediate layer. It is advantageous to apply the intermediate layer and the burning track by means of the CVD or PVD-process. The overall thickness of the intermediate layer is advantageously in the range of about 20 to about 80 μm. The layer thickness of the burning track is advantageously between about 200 to about 400 μm.

The excellent diffusion-blocking efficiency of the intermediate layer permits reduction of the layer thickness of the burning track quite substantially to the aforementioned values without any negative effects on its useful life, as compared to the state of the art. The designs of rotary anodes known heretofore often required burning track thicknesses in the range of 750 to 1000 μm. The reduced thickness of the burning track results in higher mechanical stability of the rotary anodes and less catastrophic failure due to voltage breaks. In addition, this reduced thickness translates into more favorable manufacturing costs. It is particularly advantageous if the burning track layer and the layers of the intermediate layer have a finely granular or finely stalked structure. This finely granular/stalked structure is perpendicular to the surface. The average grain diameter is preferably about 0.5 μm, most preferably about 0.1 μm. In this way, the resistance to thermal shock of the intermediate layer and its diffusion-blocking efficiency are enhanced even further. Such a structure of the intermediate layer can be obtained with particularly good results by depositing the intermediate layer by means of a PVD-process.

According to another preferred embodiment of the invention, an excellent composite body is provided with a solid graphite part joined with a carbide-forming, high-melting metal component by a layer of solder. The solder material is preferably platinum or zirconium and is arranged between the last layer of the intermediate layer and the solid part made of the carbide-forming, high-melting metal. This composite body is manufactured in a way such that the graphite is first coated with the intermediate layer, and then subsequently the solder, applied in the form of a thin foil for example or deposited by means of the CVD or PVD-process. After positioning the solid part of the high-melting metal on the solder and fixing of the composite, the composite body is then soldered. The intermediate layer prevents both adverse formation of carbide in the solder layer and degassing of the graphite. Blowholes in the solder are avoided due to the prevention of degassing. In a particularly preferred embodiment of a composite body with more than two double layers, the layer of the last double layer comprising a metal which does not form a carbide can be left out.

The invention is explained in greater detail in the following examples, which in no way should be construed as limiting the scope of the invention:

EXAMPLE 1

For the manufacture of a composite body in the form of a rotary anode for X-ray tubes with a diameter of 100 mm and a heat storage capacity of 600 kJ, an intermediate layer having the following layer sequence was deposited on a corresponding disk-shaped basic graphite body by means of cathode atomization from two sources: 10 μm Re - 2 μm W - 2 μm Re - 2 μm W - 2 μm Re - 2 μm W - 2 μm Re - 2 μm W - 2 μm Re - 2 μm W - 2 μm Re - 2 μm W - 8 μm Re.

By exploiting the ion plating effect, finely granular layers were deposited with good adhesion to the graphite.

The basic graphite body so fitted with the intermediate layer, after relief annealing at about 1200° C. for 1 hour, in which step the tungsten layers of the intermediate layer were partly carburized, was coated with a tungsten burning track coating of 400 μm by means of the CVD-process. Thereafter, the rotary anode was processed to its final shape by mechanical working.

The intermediate layer was finally formed by a final high-vacuum annealing at a temperature approximately conforming to the temperature to which the intermediate layer is exposed during its operation (about 1200°–1600° C.). The tungsten layers were partly carburized to tungsten carbide in the final annealing step.

EXAMPLE 2

For comparing the rotary anode produced according to the invention with a rotary anode according to the state of the art, a rotary anode was manufactured as specified in Example 1. However, the intermediate layer in this example was deposited on the graphite according to the state of the art as follows:

15 μm rhenium - 15 μm rhenium with 20 mole % tungsten - 10 μm rhenium.

The rotary anodes produced according to Examples 1 and 2 were then tested on a test stand for rotary anodes for X-ray tubes and compared with one another.

During the above test, the individual rotary anodes were subjected to the following stresses:

| | |
|---|---|
| Tube voltage | 120 kV |
| Tube current | 500 mA |
| Firing duration | 4 s, 100 s pause |

This conforms to an energy feed of 240 kJ within 4 seconds, with a stressing of the burning track that distinctly exceeds the expected operating conditions.

The rotary anode produced according to Example 1 of the invention, after 10,000 load cycles, showed a minor roughening of the burning track which, however, was less than the roughening observed on rotary anodes with the same heat storage capacity consisting of a powder-metallurgically produced basic body with a molybdenum alloy and a tungsten burning track under the same load conditions. The rotary anode of Example 1 still operated substantially trouble-free after 25,000 load cycles.

A subsequent electron-microscopic analysis of the rotary anode manufactured according to Example 1 showed that the burning track had a network of fine microfissures, but not any cracks extending down to the intermediate layer, and consequently no starting delamination of the burning track. A micrographic examination of a polished section of the rotary anode showed that no carburization of the burning track had occurred.

In contrast, the rotary anode manufactured according to Example 2 showed a network of rough cracks in the coating of the burning track after only 10,000 load cycles. Large-sized sections of the layer composite delaminated from the graphite after 25,000 load cycles. The test then had to be discontinued.

EXAMPLE 3

This example illustrates the surprising effect achieved by the embodiment of the intermediate layer according to the invention, in which a layer having a multiple arrangement of carbide-forming metal individual layers was formed, as compared to an intermediate layer according to the state of the art consisting of one single layer of a carbide-forming metal.

A graphite disk with the dimensions specified in Examples 1 and 2 was fitted with a 45 μm intermediate layer with the layer sequence (starting from the graphite): 15 μm Re - 15 μm W - 15 μm Re, deposited by means of cathode atomization from two sources. This conforms to an intermediate layer with a double layer as known according to the state of the art.

A second graphite disk with the same dimensions was fitted with a 45 μm intermediate layer as well, but with the following layer sequence (starting from the graphite): 5 μm Re - 5 μm W - 5 μm Re - 5 μm W - 5 μm Re - 5 μm W - 5 μm Re - 5 μm W - 5 μm Re. As shown, this embodiment had four single layers of the carbide-forming metal tungsten applied, which consequently conformed to an intermediate layer with four double layers according to the invention.

Following the application of the intermediate layer, both graphite disks were fitted with a tungsten coating of 200 μm thickness, using cathode atomization in this case as well.

Figure 2:
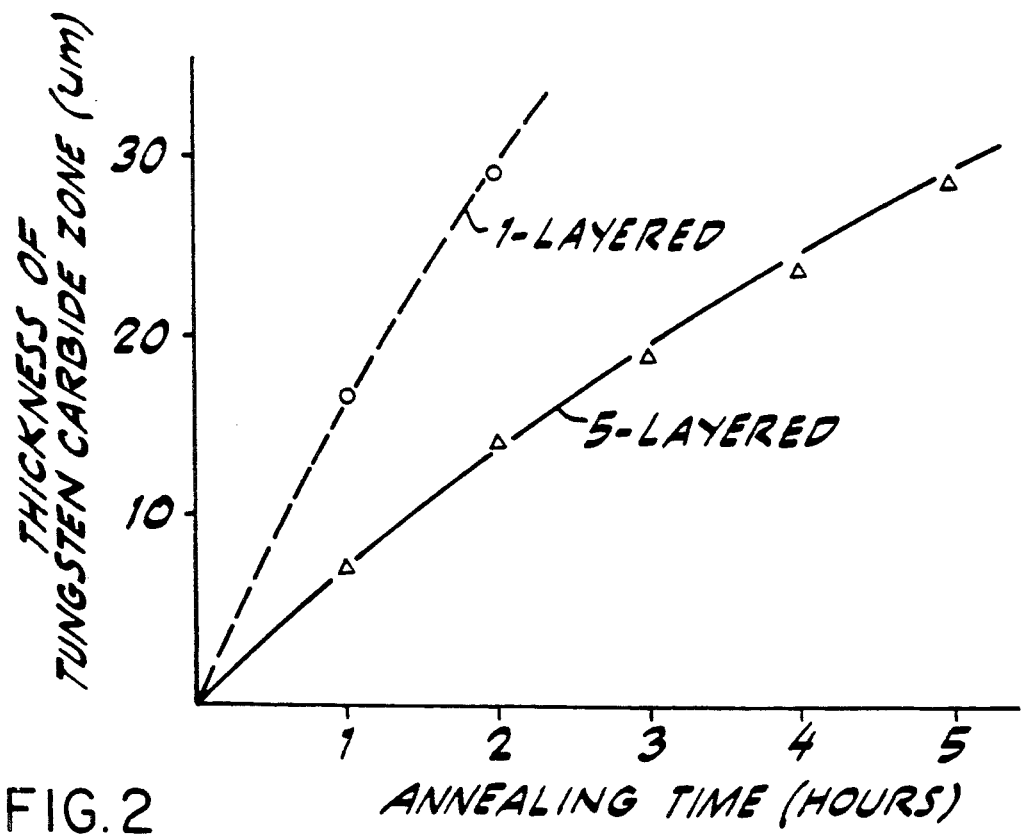
FIG. 2 is a graph comparing the thickness of the tungsten carbide zone over time at a temperature of 1500 degrees C. for a composite body according to one embodiment of the present invention as compared with the state of the art.

The graphite disks so coated were subjected to high-temperature annealing tests in a vacuum, whereby the temperature/time profile of 1200° C./1 h was raised to 1660 degrees C./5 h in temperature increments of 100 degrees C. and time increments of 1 h. Under these conditions, in the design with four double layers, the tungsten-carbide layer of $W_2C$ and WC of the same thickness (based on the sum of all tungsten layers) formed from the graphite through C-diffusion developed only at a much later point in time than with the embodiment with one double layer. This is shown in FIGS. 1 and 2 at the annealing temperatures of 1300° C. and 1500° C.

This representation furthermore shows that at the temperatures of about 1300° C. prevailing during the operation of a rotary anode in the intermediate layer, the use of an intermediate layer with four double layers can completely prevent carburizing of the burning track.

Another benefit of the embodiment according to the invention with four double layers lies in the enhanced ductility, as demonstrated in a bending-to-break test by a larger bending angle of the graphite specimen coated with four double layers, as compared to the above-described design according to the state of the art.

The invention in its broader aspects is not limited to the specific embodiments herein shown and described but departures may be made there from within the scope of the accompanying claims, without departing from the principles of the invention and without sacrificing its chief advantages.

We claim:

1. A composite body comprising:
   a graphite body;
   a multi-layer intermediate layer comprising a first layer over said graphite body of a metal or an alloy thereof which does not form a carbide at atmospheric pressure or below atmospheric pressure, and at least two succeeding double layers over said first layer such that each of said double layers comprises a first individual layer of at least one carbide-forming metal or at least one carbide thereof and a second individual layer of a metal or an alloy which does form a carbide at atmospheric pressure or below atmospheric pressure over said first individual layer, wherein in each double layer said first individual layer is disposed closest to said graphite body; and
   a high-melting metal component over said intermediate layer.

2. A composite body as claimed in claim 1, wherein said metal which does not form a carbide is rhenium or platinum.

3. A composite body as claimed in claim 2, wherein said carbide-forming metal is selected from the group consisting of tungsten, tantalum, hafnium and niobium.

4. A composite body as claimed in claim 1, wherein said intermediate layer, starting from said graphite body, has the sequence: rhenium for said first layer of said intermediate layer and then tungsten or tungsten carbide -- rhenium -- tungsten or tungsten carbide -- rhenium, respectively.

5. A composite body in the form of a rotary anode for X-ray tubes, comprising a graphite body and a multi-layered intermediate layer as claimed in claim 4, wherein said high-melting metal component is in the form of a burning track applied directly to said intermediate layer, said burning track comprising tungsten or a tungsten-rhenium alloy, and wherein said burning track and said layers of said intermediate layer have a finely granular or finely stalked structure which is perpendicular to the surface, said finely granular or finely stalked structure having been obtained by means of a CVD- or PVD-process.

6. A composite body as claimed in claim 5, wherein said intermediate layer has an overall thickness between about 20 μm and about 70 μm and wherein said burning track has a thickness in the range of about 200 μm to about 400 μm.

7. A composite body as claimed in claim 3, wherein each of said layers of said intermediate layer have a finely granular or finely stalked structure which is perpendicular to the surface, with an average grain diameter of about 0.5 μm.

8. A composite body as claimed in claim 7, wherein said average grain diameter is about 0.1 μm.

9. A composite body as claimed in claim 1, wherein said intermediate layer has a first layer of rhenium over said graphite body, and six succeeding double layers such that said first individual layers are comprised of tungsten or tungsten carbide, and said second individual layers are comprised of rhenium, whereby each of said first and second individual layers have substantially the same thickness.

10. A composite body as claimed in claim 1, wherein said intermediate layer has a first layer of rhenium over said graphite body, and five succeeding double layers such that said first individual layers are comprised of tungsten or tungsten carbide, and said second individual layers are comprised of rhenium, said composite body further comprising an additional layer of tungsten or tungsten carbide over said intermediate layer such that said high-melting metal component is arranged over said additional layer, whereby each of said first and second individual layers and said additional layer all have substantially the same thickness.

11. A composite body as claimed in claim 1, further comprising a solder layer between said high-melting metal component and said intermediate layer.

12. A composite body as claimed in claim 11, wherein said solder layer is platinum or zirconium.

* * * * *